United States Patent
Yu (10) Patent No.: US 7,668,136 B2
(45) Date of Patent: Feb. 23, 2010

(54) SYSTEM, NETWORK, MOBILE TERMINAL, COMPUTER PROGRAM PRODUCT AND METHOD FOR CROSS-PAGING A MOBILE TERMINAL VIA A DATA BURST MESSAGE

(75) Inventor: Lei Yu, San Diego, CA (US)

(73) Assignee: Nokia Corporation, Espoo (FI)

( * ) Notice: Subject to any disclaimer, the term of this patent is extended or adjusted under 35 U.S.C. 154(b) by 720 days.

(21) Appl. No.: 11/353,542

(22) Filed: Feb. 14, 2006

(65) Prior Publication Data

US 2006/0182069 A1    Aug. 17, 2006

Related U.S. Application Data

(60) Provisional application No. 60/652,674, filed on Feb. 14, 2005.

(51) Int. Cl.
*H04W 4/00*    (2006.01)
(52) U.S. Cl. ................ 370/329; 370/328; 370/345; 370/341; 455/458
(58) Field of Classification Search ............ 455/458, 455/434, 424, 425, 451, 515; 379/310, 328, 379/338, 352, 329, 345, 341, 335, 342
See application file for complete search history.

(56) References Cited

U.S. PATENT DOCUMENTS

| 6,047,071 | A | 4/2000 | Shah |
| 2002/0082029 | A1 | 6/2002 | Ahmad et al. |
| 2002/0154627 | A1* | 10/2002 | Abrol et al. ............. 370/352 |
| 2002/0187804 | A1 | 12/2002 | Narasimha et al. |
| 2004/0037222 | A1* | 2/2004 | Kim et al. .............. 370/229 |
| 2004/0120283 | A1 | 6/2004 | Rezaiifar et al. |
| 2004/0185879 | A1* | 9/2004 | Kong et al. ............. 455/458 |
| 2004/0218575 | A1* | 11/2004 | Ibe et al. ............... 370/338 |
| 2005/0276273 | A1* | 12/2005 | Oprescu-Surcobe et al. 370/401 |
| 2006/0176870 | A1* | 8/2006 | Joshi et al. ............. 370/345 |

FOREIGN PATENT DOCUMENTS

WO    WO 2004/045236    5/2004

OTHER PUBLICATIONS

The International Search Report for PCT Application No. PCT/IB2005/000339; Date of Completion Jun. 27, 2006; Date of Mailing Jun. 29, 2006.

* cited by examiner

*Primary Examiner*—Kamran Afshar
(74) *Attorney, Agent, or Firm*—Alston & Bird LLP (57) ABSTRACT

Systems and methods are provided to permit a network, such as a data only network, with which a mobile terminal is not currently communicating to notify the mobile terminal that the network desires to establish communication with the mobile terminal, even in instances in which the mobile terminal is actively communicating via another network, such as a voice and data network and has stopped monitoring for paging messages. The mobile terminal can then end communications with the network with which it has been previously communicating and commence communications with the other network that has transmitted the paging message. For example, a mobile terminal may terminate voice communications via a voice and data network in order to receive a Multimedia Message Service message via a data only network upon receiving notification that the data only network desires to establish a communications session with the mobile terminal.

31 Claims, 8 Drawing Sheets

SYSTEM, NETWORK, MOBILE TERMINAL, COMPUTER PROGRAM PRODUCT AND METHOD FOR CROSS-PAGING A MOBILE TERMINAL VIA A DATA BURST MESSAGE

CROSS-REFERENCE TO RELATED APPLICATIONS

This application claims the benefit of U.S. Provisional Application No. 60/652,674, filed Feb. 14, 2005, the contents of which are incorporated herein in their entirety.

FIELD OF THE INVENTION

The present invention generally relates to systems and methods of cross-paging a mobile terminal from one network while the mobile terminal operates in another network and, more particularly, relates to systems and methods of cross-paging a mobile terminal from a network via a data burst message (DBM) in another network within which the mobile terminal is operating.

BACKGROUND OF THE INVENTION

A communication network operates to communicate data between two, or more, communication stations. A communication network is formed, at a minimum, of a first communication station, forming a sending station, and a second communication station, forming a receiving station. The communication stations are interconnected by way of a communication channel. And data that is to be communicated by the first communication station to the second communication station is sent to the second communication station by way of the communication channel. The data that is to be communicated is converted by the first communication station into a form to permit its communication upon the communication channel. And the second communication station operates to detect the data communicated thereto and to recover the informational content thereof.

Many different types of communication networks have been developed and implemented to effectuate the communication of the data between the communication stations. And with continued advancements in communication technologies, new types of communication networks, as well as improvements to existing communication networks, have been, and continue to be, made.

A radio communication network is an exemplary type of communication network. A radio communication network utilizes radio communication channels upon which to transmit the data that is to be communicated between the communication stations operable therein. Radio communication channels are defined upon radio links forming part of the electromagnetic spectrum. As a radio link is utilized upon which to define the communication channels, the need otherwise to utilize wireline connections upon which to define communication channels is obviated. Implementation of a radio communication network is generally less costly than the corresponding costs that would be required to construct a conventional, wireline communication network. And a radio communication network can be implemented to form a mobile communication network.

A cellular communication network, exemplary of a radio communication network, has been widely implemented and has achieved wide levels of usage. A cellular communication network provides for radio communications with mobile terminals. The mobile terminals permit telephonic communication to be effectuated therethrough. A cellular communication network includes a network part that is installed throughout a geographical area and with which the mobile terminals communicate by way of radio channels. Base transceiver stations, forming portions of the network part of the communication network, are installed at spaced apart locations throughout the geographical area that is to be covered by the communication network. Each of the base transceiver stations defines a cell encompassing a portion of the geographical area. When a mobile terminal is within the cell defined by a base transceiver station, communications are generally effectuable with the base transceiver station that defines the cell.

As a mobile terminal travels between cells defined by different ones of the base transceiver stations, communication handoffs are effectuated to permit continued communications by, and with, the mobile terminal. Through appropriate positioning of the base transceiver stations, only relatively low-powered signals need to be generated to effectuate communications between a mobile terminal and a base transceiver station. Hand-offs of communications between successive base transceiver stations, as the mobile terminal moves between cells permit the continued communications without necessitating increases in the power levels at which the communication signals are transmitted. And, because only relatively low-powered signals need to be generated to effectuate communications, the same radio channels can be reused at different locations of the same cellular communication network. Efficient utilization of the frequency-spectrum allocation to the cellular communication network is thereby possible.

Various operating specifications have been promulgated that define operational parameters by which cellular, as well as other, communication networks are to be operable. Successive generations of cellular communication networks, incorporating technological advancements, as such advancements become available, have been defined by successive generations, or updates to, operational specifications. First-generation (1G) and second-generation (2G) networks have been widely implemented and have achieved significant levels of usage. In this regard, the goal of second generation (2G) networks (e.g., IS-95) was to enable pre-defined mobile telephony services that were spectrum efficient and economically viable. The result was a network that provided mobile low rate circuit switched voice communications and low rate data communications. The success of 2G is evidenced by its consumer acceptance and popularity that exceeded expectations. As more consumers used mobile terminal services, certain increasing numbers of them manifested a desire for more capacity in both voice and data. The cellular industry responded with third-generation (3G) (e.g., cdma2000) networks, the next generation that introduced packet switched data networks.

Code Division Multiple Access (CDMA) was introduced into cellular based, mobile communication systems in the early 1990s with the introduction of the IS-95 standard. Since then, CDMA technology has been well accepted in the wireless industry and has been widely disseminated reaching literally hundreds of millions of subscribers throughout the world. More recently, 3G backward-compatible evolutions of the IS-95 standard, such as the cdma2000 1X standard, have been developed to further improve the voice service capacity of CDMA while providing higher data rates for data services. As part of this evolution, the cdma2000 1X-EVDO network was developed to optimize wireless, high speed packet data services, such as may be facilitated by the Internet Protocol (IP). However, as networks such as cdma2000 1X-EVDO only support packet data services, mobile terminals, sometimes referred to as hybrid terminals, have been developed that are capable of accessing networks, such as cdma2000 1X, that provide both voice and data services, as well as networks such as cdma2000 1X-EVDO that provide higher-speed packet data services. Thus, a hybrid terminal could utilize a cdma2000-1X network for voice communications and for short message service (SMS), and a cdma2000-1X-EVDO network for multimedia message service (MMS) and for other data communications.

In a network such as cdma2000 1X or 1X-EVDO, when a message (i.e., a "call") is to be terminated at a mobile terminal, the network infrastructure broadcasts a paging message to alert the mobile terminal of the message. Monitoring channels of the respective network, the mobile terminal detects the paging message and, in response, performs various operations to receive the terminating message. With respect to the detection of a paging message, slotted mode operation was introduced in cdma2000 1X systems to conserve the life of a mobile terminal's battery. In this regard, the channel via which paging messages are transmitted, e.g., the forward common signaling logical channel (f-csch), is divided into 2048 slots. A mobile terminal operating in slotted mode is therefore assigned one of the slots and only needs to monitor its assigned slot and subsequent slot. See, for example, FIG. 1. Other than its assigned slot and the subsequent slot, the mobile terminal can opt to turn off its receiver/transmitter and to defer other non-vital processing. Each paging slot in a cdma2000 1X system is 80 ms in length and the slot assigned to a mobile terminal is determined through a hash algorithm defined in the cdma2000 1X standard. By way of example, the hash algorithm takes the phone number (MIN) of the mobile terminal and determines which slot of the 2048 possible slots (denoted slots 0~2047) is the slot assigned to the mobile terminal. Since the cdma200 1X network also uses the same hash algorithm, the network is also aware which is the slot assigned to the mobile terminal.

Figure 1:
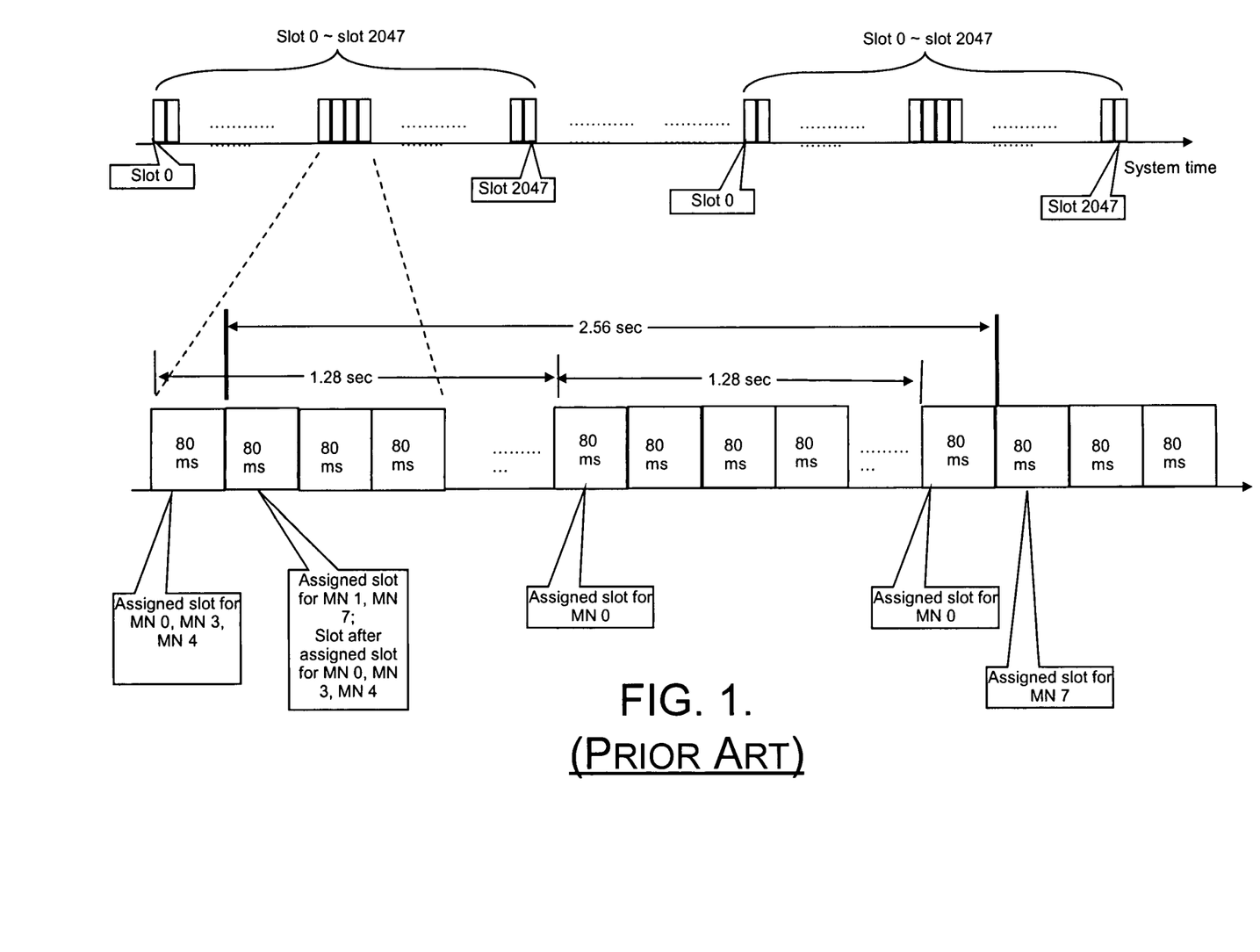
FIG. 1 is a schematic representation of the slotted mode operation provided by a conventional cdma2000 system.

Also defined in a cdma2000 1X system is the concept of a slot cycle. In this regard, once a mobile terminal determines its assigned slot, the mobile terminal will wake up every slot cycle to check if there is page indication or other message addressed to it in its assigned slot or in the subsequent slot. As shown in FIG. 1, the mobile terminals may have different slot cycles with the cycle of MN 0 being 1.28 seconds and the cycle of MN 7 being 2.56 seconds, for example. Moreover, by permitting messages to be transmitted to the mobile terminal both in its assigned slot and in the subsequent slot, the network has improved flexibility in regards to the scheduling of the messages to the mobile terminal which is particularly useful in instances in which the paging channel is crowded.

Figure 2:
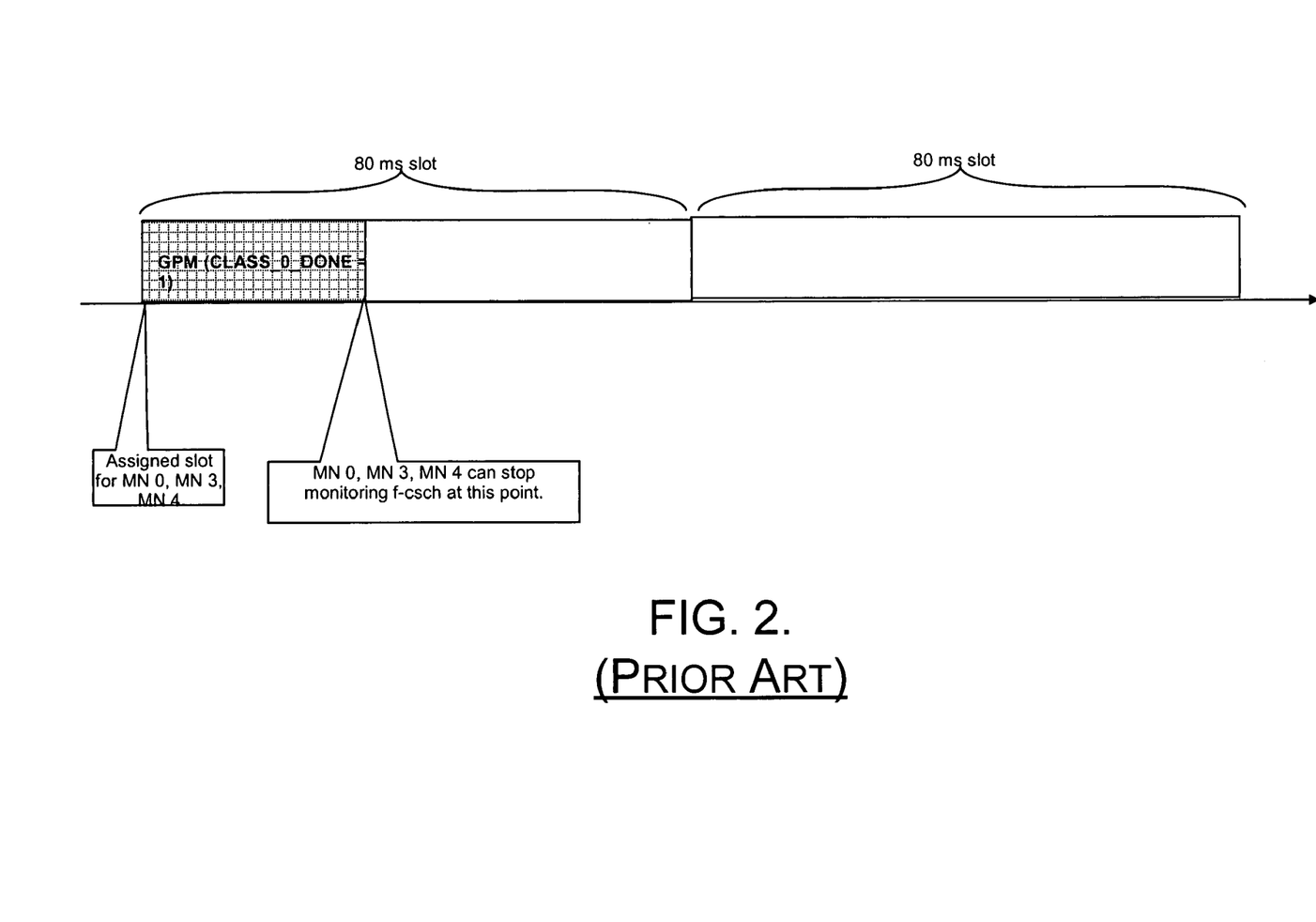
FIG. 2 is a schematic representation of the use of GPM in a conventional manner to halt the monitoring of a slot as soon as practical.

Since there are only 2048 possible slot positions, different mobile terminals can be assigned the same slot. See FIG. 1 in which MN 0, MN 3 and MN 4 are all assigned to one slot, and MN 1 and MN 7 are all assigned to another slot. Before monitoring its assigned slot, a mobile terminal does not know whether there will be pages/messages for the mobile terminal in its next assigned slot. If the network does not need to page or transmit any other message to any of the mobile terminals in that assigned slot, the network advantageously advises the mobile terminals assigned to the slot as soon as possible within the slot so that mobile terminals can go to sleep as early as possible, thereby further conserving battery power. As shown in FIG. 2, the mechanism in a cdma2000 1X network is to set the CLASS_0_DONE field to '1' in the General Page Message (GPM) to indicate that there are no pages/messages for the mobile terminals of the respective slot. Upon receiving this GPM in the assigned slot, the mobile terminals can go to sleep immediately, i.e., prior to the end of the slot as shown in FIG. 2. In the common instance in which many mobile terminals utilize the same slot, the network cannot transmit the GPM with the CLASS_0_DONE field set to 1 until any messages have been transmitted to the mobile terminals assigned to the slot. For those mobile terminals that are not receiving a message, the mobile terminals must stay awake, during the transmission of messages to other mobile terminals, thereby unnecessarily consuming battery power.

As will be appreciated by those skilled in the art, however, in various instances of operating in a network such as cdma2000 1X, a mobile terminal may not otherwise monitor for paging messages from a cdma2000 1X-EVDO network, thereby conserving battery power. For example, a mobile terminal may initially be operating in a cdma2000 1X-EVDO network in conjunction with a data application, e.g., the download of an ftp file. At some point in time, the data application may go dormant, such as upon completion of the ftp file download, and the mobile terminal may be placed in an idle state by the cdma2000 1X-EVDO network. The mobile terminal may thereafter switch to a cdma2000 1X network. The mobile terminal may switch to the cdma2000 1X network for many reasons including the loss of network services by the cdma2000 1X-EVDO network coupled with the discovery of network services by the cdma2000 1X network or the placing of a voice call by the mobile terminal. Since the mobile terminal is now monitoring a different frequency for signals from the cdma2000 1X network than from the cdma2000 1X-EVDO network, the mobile terminal will no longer be monitoring for paging messages from the cdma2000 1X-EVDO network. In addition to frequency differences, differences in the over-the-air technology between two networks would also prevent the mobile terminal active in one network from monitoring for paging messages in another network. In such instances, although the cdma2000 1X-EVDO network may have a message to be terminated at the mobile terminal operating in the cdma2000 1X network, such as an advertisement or the download of a new movie, the cdma2000 1X-EVDO network may be unable to reach the mobile terminal via a paging message.

SUMMARY OF THE INVENTION

In light of the foregoing background, embodiments of the present invention provide a system, a network, a mobile terminal and a method for cross-paging a mobile terminal even in instances in which the mobile terminal has stopped monitoring for paging messages. In this regard, a target network, such as a data only network (e.g., cdma2000 1X-EVDO), with which the mobile terminal is not currently communicating may notify the mobile terminal that the target network desires to establish communication with the mobile terminal, even in instances in which the mobile terminal is actively communicating via an anchor network, such as a voice and data network (e.g., cdma2000 1X) and has stopped monitoring for paging messages from other networks. As such, the mobile terminal can end communications with the anchor network and can then commence communications with the target network. For example, a user of a mobile terminal may terminate voice communications via a voice and data network in order to receive a MMS message or download a movie via a data only network upon receiving notification that the data only network desires to establish a communications session with the mobile terminal.

The target network may notify the mobile terminal of its desire to communicate with the mobile terminal by means of a message, such as a page message, transmitted to the anchor network. The anchor network of this embodiment can then issue a Data Burst Message (DBM) including a predefined code to the mobile terminal notifying the mobile terminal of the inquiry from the target network. In response to the DBM, the mobile terminal may determine if a switch should be made from the anchor network to the target network and, if so, may end the anchor traffic channel assignment and issue a connection request to the target network to initiate target network traffic and service setup. Along with a page notification, the target network can provide the anchor network with network and service availability information. This network and service availability information can assist the user in determining whether to switch to the target network and, if so, can assist in rapidly and efficiently performing the target network traffic and service setup.

According to one embodiment, the signaling sequence is altered for those mobile terminals that are in an idle state. In the slot to which the mobile terminals are assigned, a general page message (GPM) may be transmitted with a predefined field set to a predetermined value which notifies all non-hybrid mobile terminals, i.e., those mobile terminals that would be incapable of communicating with the target network, assigned to the slot to cease monitoring the slot and to go back to sleep. The hybrid mobile terminals continue monitoring the slot so as to receive the DBM which is directed to one or more hybrid mobile terminals. A conventional GPM can then be issued to direct the remaining hybrid mobile terminals, i.e., those hybrid mobile terminals that have not switched to a target network, to cease monitoring the slot and to go back to sleep. By employing the signaling sequence of this embodiment of the present invention, the battery life of the non-hybrid mobile terminals is therefore further conserved.

According to exemplary embodiments, a method and computer program product is provided for cross-paging a selected hybrid mobile terminal which includes receiving a page indication from a target network. The page indication indicates that the target network desires to communicate with the selected hybrid mobile terminal. A first message of a series of messages is then sent to the selected hybrid mobile terminal which is one of a group of hybrid mobile terminals and non-hybrid mobile terminals. The first message directs the at least one non-hybrid mobile terminal to cease monitoring a slot if a predefined field of the first message is set to a predetermined value. A second message of the series of messages is then sent. The second message includes a data burst message indicative of the page indication to the selected hybrid mobile terminal. A third message of the general page message may then be sent. The third message directs any remaining hybrid mobile terminals to cease monitoring the slot.

According to another exemplary embodiment, a system and networks for cross-paging a selected hybrid mobile terminal are provided. The system includes an anchor network and a target network. The anchor network is capable of communication with at least one hybrid mobile terminal and at least one non-hybrid mobile terminal in a slot. The target network is capable of issuing a page indication to the anchor network. The page indication indicates that the target network desires to communicate with the selected hybrid mobile terminal, which is one of the hybrid mobile terminals. The anchor network issues a series of messages to the at least one hybrid mobile terminal and the at least one non-hybrid mobile terminal. The series of messages includes a first message and a second message. The first message directs the at least one non-hybrid mobile terminal to cease monitoring the slot if a predefined field of the first message is set to a predetermined value. The second message includes a data burst message indicative of the page indication to the selected hybrid mobile terminal.

According to another exemplary embodiment, a mobile terminal capable of being cross-paged is provided. The mobile terminal monitors a slot while in communication with an anchor network and is capable of communication with a target network. The mobile terminal includes a controller capable of receiving a series of messages from the anchor network. The series of messages includes a first message and a second message. The first message directs any non-hybrid mobile terminal in communication with the anchor network to cease monitoring the slot if a predefined field of the first message is set to a predetermined value. The second message includes a data burst message indicative of a page indication to the mobile terminal, with the page indication indicating that the target network desires to communicate with the mobile terminal.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
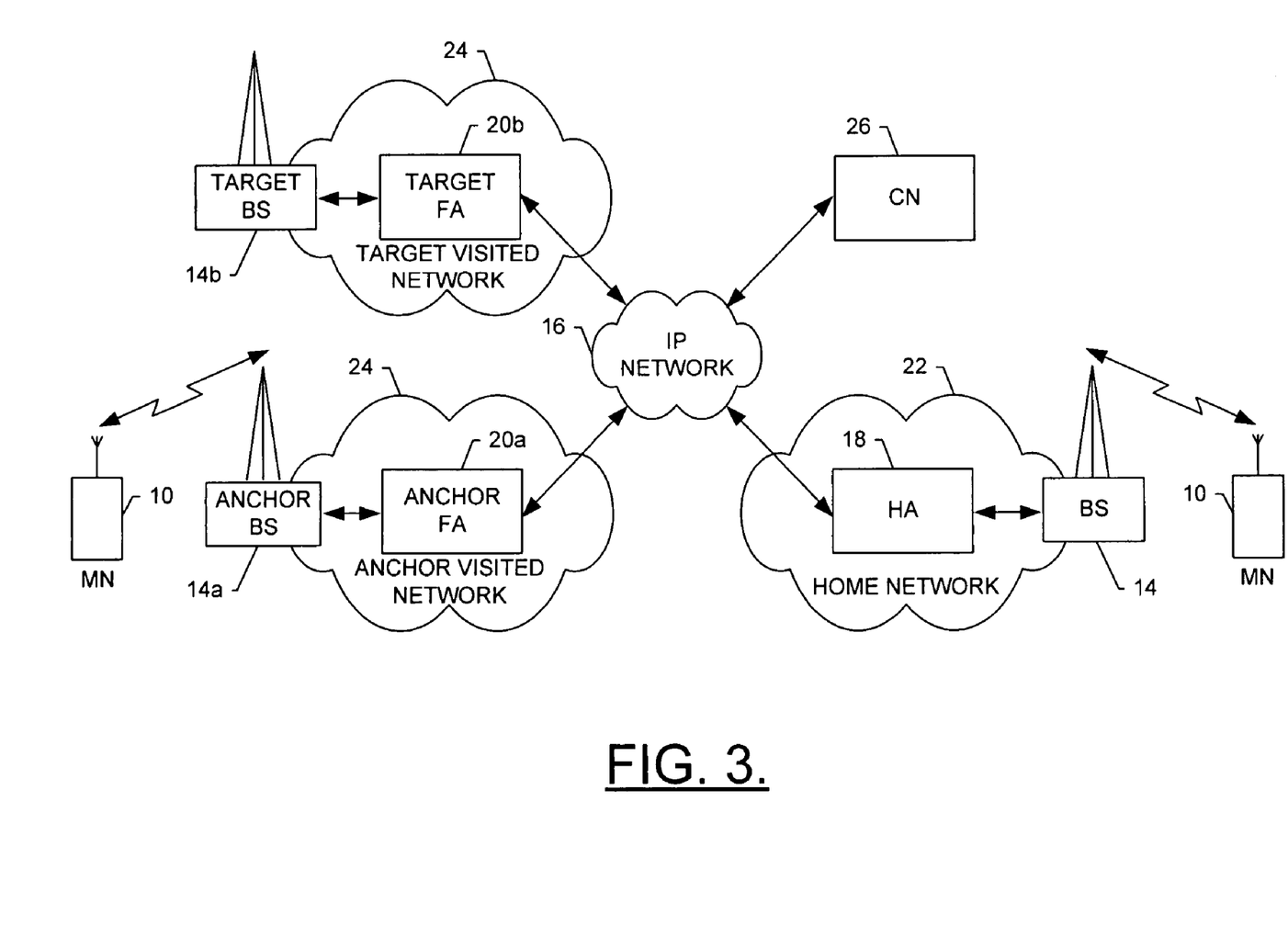
FIG. 3 is a block diagram of one type of mobile node and system that would benefit from embodiments of the present invention.

Referring to FIG. 3, an illustration of one type of system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, the system can include a mobile terminal, hereinafter a mobile node (MN), 10 capable of transmitting signals to and for receiving signals from base sites or base stations (BS) 14, two of which are shown in FIG. 3 (shown and described below as including an anchor BS 14a and a target BS 14b). The base station is a part of one or more cellular or mobile networks that include elements required to operate the network, such as a mobile switching center (MSC) (not shown). As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center.

The MN 10 can also be coupled to a data network. For example, the BS 14 can be coupled to a data network, such as a local area network (LAN), a metropolitan area network (MAN), and/or a wide area network (WAN). In one typical embodiment, the BS is coupled to a gateway, which is coupled to the data network, such as an Internet Protocol (IP) network 16. The gateway can comprise any of a number of different entities capable of providing network connectivity between the MN and other nodes directly or indirectly coupled to the data network. As will be appreciated, the gateway can be described in any of a number of different manners, such as a home agent (HA) 18, foreign agent (FA) 20 (shown and described below as including an anchor FA 20a and a target FA 20b), packet data serving node (PDSN), access router or the like. In this regard, a HA can comprise a router within a home network 22 of the MN. The HA is capable of tunneling data for delivery to the MN when the MN is away from home, and can maintain current location information for the MN. A FA, on the other hand, can comprise router within a visited network 24 of the MN (shown and described below as including an anchor visited network 24a and a target visited network 24b). The FA provides routing services to the MN while the MN is registered with the visited network. In operation, the FA detunnels data from the HA, and delivers the data to the MN. Then, for data sent from a MN registered with the visited network, the FA can serve as a default router.

The other nodes coupled to the MN 10 via the IP network 16 can comprise any of a number of different devices, systems or the like capable of communicating with the MN in accordance with embodiments of the present invention. As described herein, a node capable of communicating with the MN via the IP network is referred to as a correspondent node (CN) 26, one of which is shown in FIG. 3. The other CNs can comprise, for example, personal computers, server computers or the like. Additionally or alternatively, for example, one or more CNs can comprise, other MNs, such as mobile telephones, portable digital assistants (PDAs), pagers, laptop computers, or the like.

Although not every element of every possible network is shown and described herein, it should be appreciated that the MN 10 can be coupled to one or more of any of a number of different networks. As shown and described herein, the anchor visited network 24a is capable of supporting communication in accordance with third-generation (3G) mobile communication protocol cdma2000 1X (TIA/EIA/IS-2000), while the target visited network 24b is capable of supporting communication in accordance with 3G mobile communication protocol cdma2000 1XEV-DO (TIA/EIA/IS-856). It should be appreciated, however, that the mobile network(s) may be equally capable of operating in accordance with embodiments of the present invention while supporting communication in accordance with any one or more of a number of other first-generation (1G), second-generation (2G), 2.5G, 3G or other mobile communication protocols. For example, one or more networks capable of supporting communication in accordance with 2G wireless communication protocols IS-136 (TDMA), GSM, IS-95 (CDMA) or the like; 2.5G wireless communication protocols GPRS, Enhanced Data GSM Environment (EDGE) or the like; and/or 3G wireless communication protocols Universal Mobile Telephone System (UMTS) network employing Wideband Code Division Multiple Access (WCDMA) radio access technology, cdma2000 1XEV-DV or the like.

Figure 4:
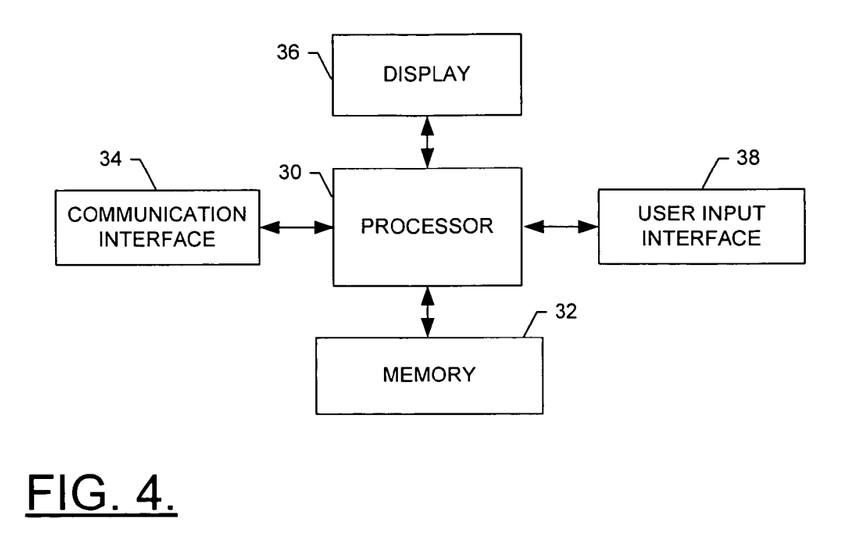
FIG. 4 is a schematic block diagram of an entity capable of operating as a mobile node, home agent, foreign agent and/or correspondent node, in accordance with embodiments of the present invention.

Referring now to FIG. 4, a block diagram of an entity capable of operating as a MN 10, HA 18, FA 20 and/or CN 26 is shown in accordance with one embodiment of the present invention. Although shown as separate entities, in some embodiments, one or more entities may support one or more of a MN, HA, FA and/or CN, logically separated but co-located within the entit(ies). For example, a single entity may support a logically separate, but co-located, HA and CN. Also, for example, a single entity may support a logically separate, but co-located FA and CN.

As shown, the entity capable of operating as a MN 10, HA 18, FA 20 and/or CN 26 can generally include a processor 30 connected to a memory 32. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

In addition to the memory 32, the processor 30 can also be connected to at least one interface or other means for displaying, transmitting and/or receiving data, content or the like. In this regard, the interface(s) can include at least one communication interface 34 or other means for transmitting and/or receiving data, content or the like, as well as at least one user interface that can include a display 36 and/or a user input interface 38. The user input interface, in turn, can comprise any of a number of devices allowing the entity to receive data from a user, such as a keypad, a touch display, a joystick or other input device.

Figure 5:
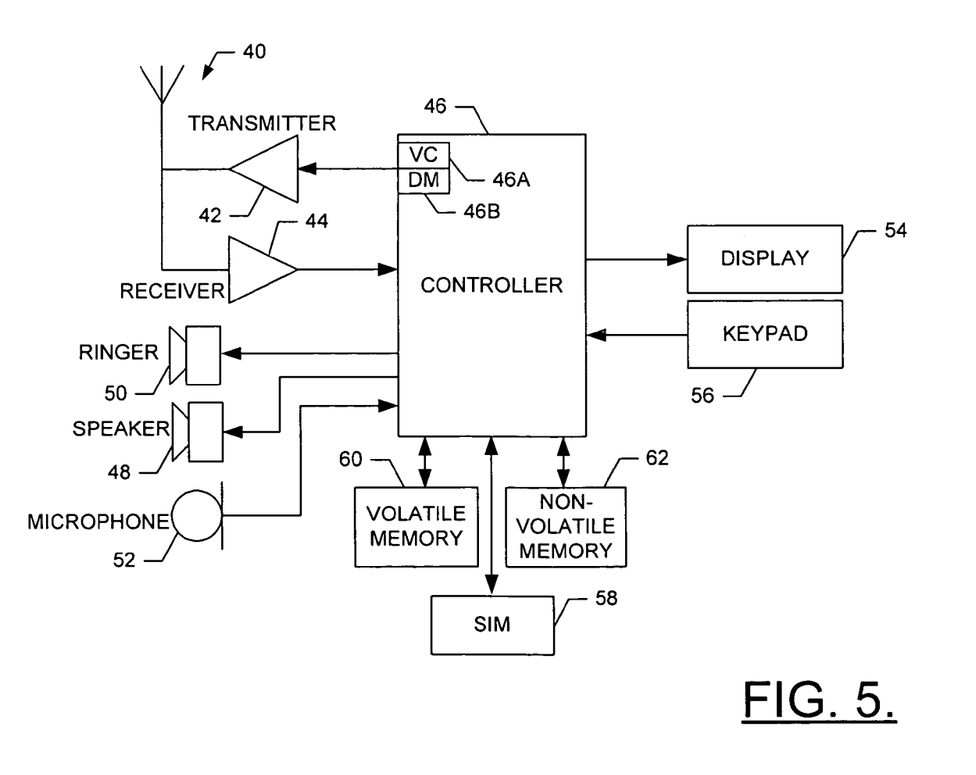
FIG. 5 is a schematic block diagram of a mobile node, in accordance with one embodiment of the present invention.

Reference is now made to FIG. 5, which illustrates one type of MN 10 that would benefit from embodiments of the present invention. It should be understood, however, that the MN illustrated and hereinafter described is merely illustrative of one type of MN that would benefit from the present invention and, therefore, should not be taken to limit the scope of the present invention. While several embodiments of the MN are illustrated and will be hereinafter described for purposes of example, other types of MNs, such as portable digital assistants (PDAs), pagers, laptop computers and other types of electronic systems, can readily employ the present invention.

As shown, in addition to an antenna 40, the MN 10 includes a transmitter 42, a receiver 44, and a controller 46 that provides signals to and receives signals from the transmitter and receiver, respectively. These signals include signaling information in accordance with the air interface standard of the applicable cellular system, and also user speech and/or user generated data. In this regard, the MN can be capable of operating with one or more air interface standards, communication protocols, modulation types, and access types. As explained herein, the MN is capable of operating in accordance with the cdma2000 1X and cdma2000 1XEV-DO communication protocols. It should be understood, however, that the MN may more generally be capable of operating in accordance with any of a number of 1G, 2G, 2.5G, 3G or other communication protocols.

It is understood that the controller 46 includes the circuitry required for implementing the audio and logic functions of the MN 10. For example, the controller may be comprised of a digital signal processor device, a microprocessor device, and various analog-to-digital converters, digital-to-analog converters, and other support circuits. The control and signal processing functions of the MN are allocated between these devices according to their respective capabilities. The controller can additionally include an internal voice coder (VC) 46A, and may include an internal data modem (DM) 46B. Further, the controller may include the functionality to operate one or more software programs, which may be stored in memory (described below). For example, the controller may be capable of operating a connectivity program, such as a conventional Web browser. The connectivity program may then allow the MN to transmit and receive Web content, such as according to HTTP and/or the Wireless Application Protocol (WAP), for example.

The MN 10 also comprises a user interface including a conventional earphone or speaker 48, a ringer 50, a microphone 52, a display 54, and a user input interface, all of which are coupled to the controller 46. The user input interface, which allows the MN to receive data, can comprise any of a number of devices allowing the MN to receive data, such as a keypad 56, a touch display (not shown) or other input device. In embodiments including a keypad, the keypad includes the conventional numeric (0-9) and related keys (#, *), and other keys used for operating the MN. Although not shown, the MN can include a battery, such as a vibrating battery pack, for powering the various circuits that are required to operate the MN, as well as optionally providing mechanical vibration as a detectable output.

The MN 10 can also include memory, such as a subscriber identity module (SIM) 58, a removable user identity module (R-UIM) or the like, which typically stores information elements related to a mobile subscriber. In addition to the SIM, the MN can include other removable and/or fixed memory. In this regard, the MN can include volatile memory 60, such as volatile Random Access Memory (RAM) including a cache area for the temporary storage of data. The MN can also include other non-volatile memory 62, which can be embedded and/or may be removable. The non-volatile memory can additionally or alternatively comprise an EEPROM, flash memory or the like. The memories can store any of a number of pieces of information, and data, used by the MN to implement the functions of the MN. For example, the memories can store an identifier, such as an international mobile equipment identification (IMEI) code, international mobile subscriber identification (IMSI) code, mobile station integrated services digital network (MSISDN) code (mobile telephone number), Session Initiation Protocol (SIP) address or the like, capable of uniquely identifying the mobile station, such as to a mobile network 22, 24.

As explained in the background section, a network, such as a data only network (e.g., cdma2000 1X-EVDO), may desire to establish communication with a MN 10 operating in another network, such as a voice and data network (e.g., cdma2000 1X). For example, a cdma2000 1X-EVDO network may desire to transmit an MMS message or download a file, such as a movie or an advertisement, to the MN, which is currently supporting voice communications via a cdma2000 1X network. However, a MN operating in the one network may have stopped monitoring for paging messages for the other network(s), which is the conventional technique by which a network with which a MN was not currently communicating would notify the MN that it desired to establish communication with the MN. In this regard, the MN may have stopped monitoring for paging messages in compliance with the governing standards in order to reduce battery consumption, as described above.

As explained in greater detail below, embodiments of the present invention are therefore capable of permitting a network, such as a data only network (e.g., cdma2000 1X-EVDO), with which the MN 10 is not currently communicating to notify the MN that the network desires to establish communication with the MN, even in instances in which the MN is actively communicating via another network, such as a voice and data network (e.g., cdma2000 1X) and has stopped monitoring for paging messages from other networks. As such, the MN can end communications with the network with which it has been previously communicating, typically upon receiving authorization from the MN or the user of the MN, and can then commence communications with the other network that has notified the MN of its desire to communicate with the MN. For example, a user of a MN may terminate voice communications via a voice and data network in order to receive a MMS message or download a movie via a data only network upon receiving notification that the data only network desires to establish a communications session with the MN.

Figure 6:
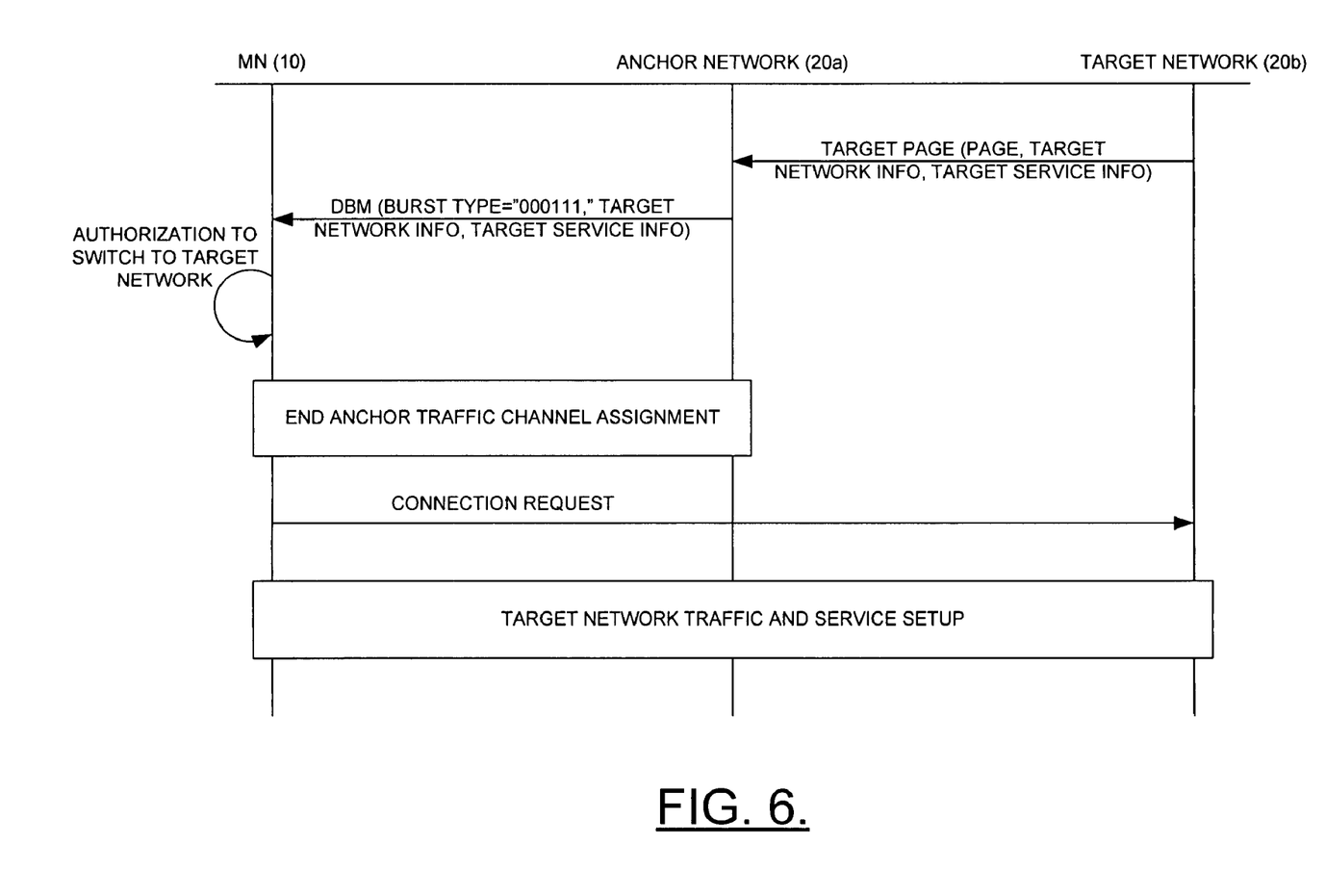
FIG. 6 is a control flow diagram illustrating communication between various entities performing a method of cross-paging a mobile terminal, in accordance with one embodiment of the present invention.

Reference is now made to FIG. 6, which illustrates a control flow diagram of a method of cross-paging a MN 10 operating in a current, anchor FA 20a in a first network such as during a communication session between the MN and a CN 26, with the MN being notified from a new, target FA 20b in a different network that the target FA desires to communicate with the MN. As explained herein, the MN is communicating with an anchor FA. It should be understood, however, that the MN can be equally communicating with an anchor HA 18, without departing from the spirit and scope of the present invention. Also, as explained below, the method of FIG. 6 is applicable to cross-paging a MN by a cdma2000 1X-EVDO network while the MN is operating in a cdma2000 1X network, or perhaps vice versa in the future with suitable extensions of the signaling provided by the cdma2000 1X-EVDO network. In this regard, the method of FIG. 6 will be explained in conjunction with cross-paging a MN from a target PDSN (i.e., target FA) in a cdma2000 1X-EVDO network while the MN is in a communication session with an anchor PDSN (i.e., anchor FA) in a cdma2000 1X network. It should be understood, however, that the method of FIG. 6 can be equally applicable to cross-paging a MN from any of a number of other networks while the MN is operating in the same or a different type of network, without departing from the spirit and scope of the present invention.

As shown in FIG. 6, a method of cross-paging a MN 10 in accordance with one embodiment of the present invention includes a MN 10 initially communicating with an anchor PDSN in an anchor network 20a, i.e., a cdma 2000 1X network. For example, the MN and the anchor PDSN may be engaged in voice communications or in the exchange of SMS messages. During this communication session with the anchor PDSN, the MN may cease to monitor paging messages from other networks which would otherwise alert the MN that another network is desirous of communicating with the MN. The MN's cessation of monitoring for paging messages is typically governed by the applicable standards and may be done for various reasons including, for example, in order to conserve battery consumption.

In the method of FIG. 6, a target network 20b, such as a cdma2000 1X-EVDO network, may desire to establish communications with the MN 10, but may determine that the MN is currently active in an anchor network 20a. In this situation, the target network transmits a target page to the anchor network. This target page not only includes a page notification, but also advantageously includes network information and service availability information relevant to the target network. Among other information, the network information may, for example, include frequency information for the target network, overhead information and/or a traffic channel assignment for the target network. The anchor network then constructs a Data Burst Message (DBM) for delivery to the MN to alert the MN that the target network desires to communicate with the MN. Although the MN may not be monitoring for paging messages from the target network, the MN will receive and respond to a DBM, thereby permitting the MN to be alerted to page notifications from the target network even after the MN has stopped monitoring for paging messages.

The DBM generally includes a predefined code in a predetermined field to advise the MN that the DBM and the information included therein effectively constitute a page notification from another network. Although various codes may be utilized in different fields, the DBM of one embodiment is structured such that the anchor network 20a sets the Burst Type field to 000111 in order to alert the MN 10 that another network has issued a page notification. In addition to the inclusion of the predefined code in the Burst Type field, the other information provided by the target network 20b, such as network information and service availability information may also be encapsulated and included in the DBM. The anchor network can transmit the DBM to the MN while the MN is in either an idle state or a traffic state. If in an idle state, the anchor network typically transmits the DBM in the slot assigned to the MN, or in the slot that follows the assigned slot. Alternatively, if in a traffic state, the anchor network merely transmits the DBM to the MN in a conventional fashion.

Upon receiving the DBM with the predefined code in the predetermined field, such as with the Burst Type field set to 000111, the MN 10 may determine if it is desirous to switch from the anchor network 20a to the target network 20b. In this regard, if the MN is in an idle state, the MN may be automatically switched to the target network, typically at the soonest possible opportunity. Alternatively, if the MN is in a traffic state, the MN may be configured to automatically switch from the anchor network to the target network at the earliest practical opportunity. Typically, however, a MN in the traffic state is configured to first solicit user authorization, such as via an icon presented upon the display of the MN that advises the user that another network desires to communicate with the MN. Since the target network has provided various service and other network information along with the page notification, the MN may, but need not necessarily, present at least some of this additional information to the user or at least permit the user to access some of this additional information upon request, thereby permitting the user to make a more informed decision as to whether the user wishes to switch from the anchor network to the target network. For example, a user may be engaged in a voice call with a friend upon receiving a notification that another network desires to communicate with the MN. Upon reviewing the additional information associated with the notification, the user may elect to terminate the voice call and switch to the other network in instances in which the additional information indicates that a new movie that the user desires to view is now available for download. Alternatively, the user may elect to continue the voice call and delay any switch to the other network in instances in which the additional information indicates that the other network merely wishes to download an advertisement to the MN.

If the user does not wish to switch to the target network or if the MN 10 is otherwise unable to switch to the target network, the MN transmits a predefined signal, such as a Mobile Station Reject Order, to the anchor network 20a which, in turn, advises the target network 20b. If, however, the MN is to switch to the target network, be it either automatically as a result of the MN being in an idle state or as a result of receiving authorization from the user of the MN in a traffic state, the MN issues a connection request to the target network. In instances in which the MN has been in a traffic state with the anchor network, the MN must first end the current traffic channel assignment, typically at the first practical opportunity, prior to issuing the connection request. In order to further speed the transition to the target network, the MN may forego the typical responses, such as a page response that is typically issued in response to a page or a Mobile Station Acknowledgment Order (MS Ack) that is generally issued in response to a DBM. As will be apparent to those skilled in the art, the construction of the connection request by the MN is facilitated by the network information and the service availability information that was previously provided by the target network. For example, the network information may include frequency information regarding the target network which assists the MN in determining the frequency on which the MN can expect service from the target network, thereby preventing the MN from having to search for service from the target network based on a frequency list provide by the carrier. As another example, the network information may also include overhead information regarding the target network. Since a MN is required to obtain the latest overhead information from the target network before transmitting the connection request, the MN need not await the periodic transmission of the overhead information by the target network but can issue the connection request immediately after acquiring the target network since the MN already received the overhead information in the DBM. Finally, the network information may include a traffic assignment in the target network which allows the MN to directly switch to the particular traffic channel in the target network without even transmitting a connection request.

Upon receiving the connection request, the target network 20b and the MN 10 can perform the conventional traffic and service setup procedure. Thereafter, the MN communicates with a target PDSN via the target network, such as to exchange MMS messages or other data only services, for example.

As a result of employing the cross-paging technique of embodiments of the present invention, the target network 20b can provide a page notification to the MN 10 in order to initiate the switch from the anchor network 20a to the target network even though the MN has ceased to monitor paging messages from other networks. Moreover, by providing network information and/or a traffic channel assignment along with the page notification, the MN can connect to the target network more rapidly and efficiently. Further, by providing service availability information along with the page notification, the user of a MN in a traffic state with an anchor network can make a more educated decision as to whether the user desires to switch to the target network. The cross-paging technique of embodiments of the present invention also provides that the target and anchor networks advise the MN of the page notification from the target network in the same manner whether the MN is in an idle state or a traffic state, thereby simplifying the signaling procedure on the network side.

Figure 7:
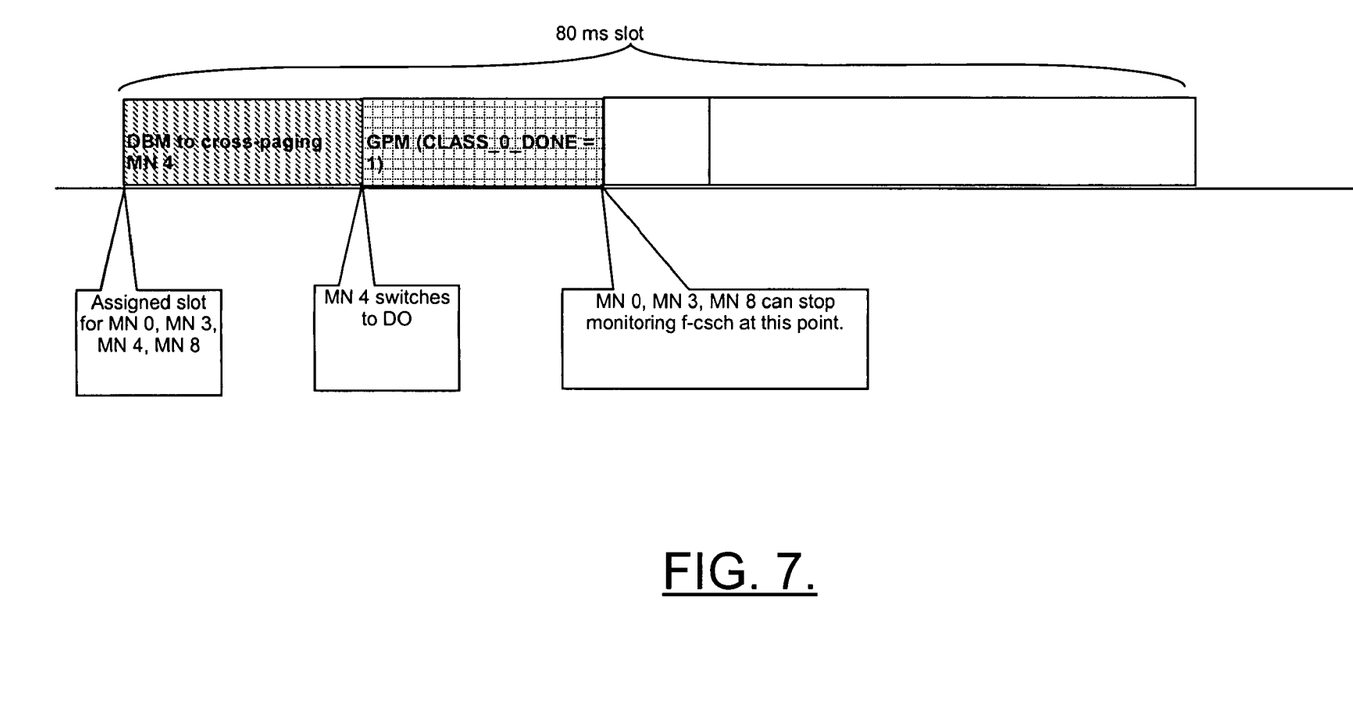
FIG. 7 is a schematic representation of a DBM transmitted in a slot in accordance with one embodiment of the present invention.

As described in the background section, cdma2000 1X networks utilize a slotted mode of operation while a MN 10 is in the idle state to conserve the life of a MN's battery. As also described above, a cdma2000 1X network employs a GPM with the CLASS_0_DONE field set to '1' to indicate that there are no pages/messages for the MNs assigned to the respective slot such that the MNs can go to sleep immediately, i.e., prior to the end of the slot, and further conserve battery power. In order to insure that the MN receives the DBM indicating that the target network 20b desires to communicate with the MN, the DBM must be transmitted prior to the GPM with the CLASS_0_DONE field set to 1. As shown in FIG. 7, MN 0, MN 3, MN 4 and MN 8 are all assigned to the same slot. Prior to sending the GPM, the DBM is transmitted as described above which indicates that a target network desires to communicate with MN 4. Following receipt of the DBM, MN 4 switches to the target network, while MN 0, MN 3 and MN 8 continue to monitor the slot. The GPM with the CLASS_0_DONE field set to 1 is then transmitted such that MN 0, MN 3 and MN 8 can go to sleep. As will be apparent, the need for all of the MNs to monitor the slot until receipt of the GPM with the CLASS_0_DONE field set to 1 disadvantageously consumes battery power of the MNs to which the DBM is not directed. In fact, some of the MNs may be non-hybrid MNs that can only communicate in a voice and data network and not in a data only network. Nonetheless, all of the MNs, including the non-hybrid MNs that cannot communicate in a data only network, remain powered on to receive the DBM even though the DBM is irrelevant to the non-hybrid MNs in this scenario.

Figure 8:
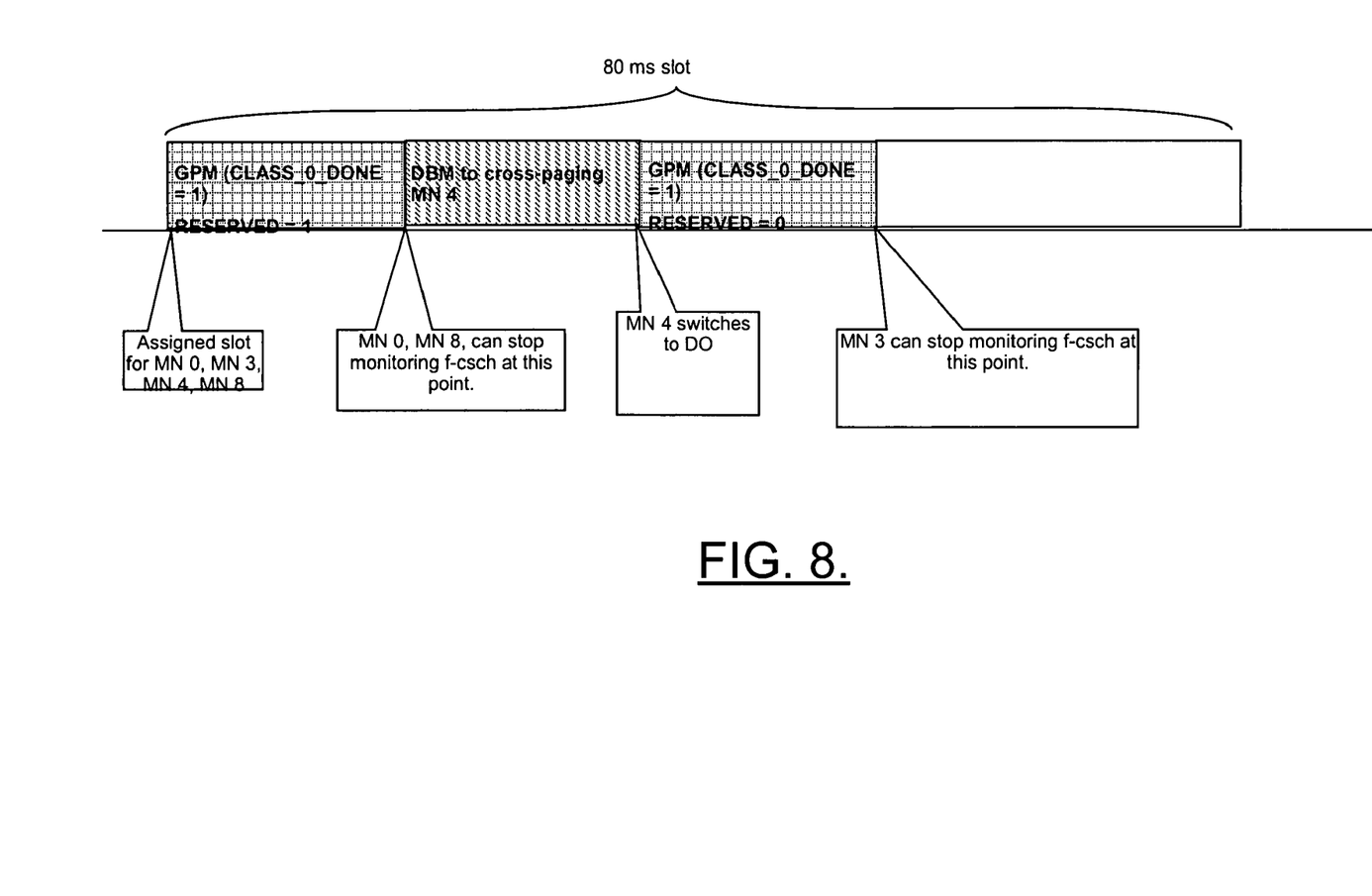
FIG. 8 is a schematic representation of a modified GPM and a DBM transmitted in a slot in accordance with another embodiment of the present invention.

As such, one embodiment of the present invention utilizes a predefined field, such as the RESERVED field, in the GPM to alter the process by which MNs are put back to sleep in order to further conserve battery power, especially for the non-hybrid MNs. As shown in FIG. 8, for example, in which MN 0, MN 3, MN 4 and MN 8 are again assigned to the same slot, consider the situation in which MN 0 and MN 8 are non-hybrid MNs and MN 3 and MN 4 are hybrid MNs. A GPM with the CLASS_0_DONE field set to 1 may be initially transmitted by the anchor network 20a. In contrast to a conventional GPM, a predefined field, e.g., the RESERVED field, is set to a predetermined value, such as 1. The non-hybrid MNs that could not access the target network in any event do not examine the RESERVED field and, instead, cease monitoring the paging channel and go back to sleep. The hybrid MNs review the predefined field for further instructions. In instances in which the predefined field is set to the predetermined value, e.g., the RESERVED field is set to 1, the hybrid MNs continue to monitor the paging channel for a DBM. Alternatively, if the predefined field was not set to the predetermined value, e.g., the RESERVED field is set to 0, the hybrid MNs could also cease monitoring the paging channel and go back to sleep.

In instances in which the predefined field is set to the predetermined value, the anchor network 20a may next transmit a DBM as described above. As shown in FIG. 8, the DBM indicates that a target network 20b desires to communicate with MN 4. Following the DBM, MN 4 can switch to the target network as described above, while MN 3 continues to monitor the paging channel. A conventional GPM with the CLASS_0_DONE field set to 1 and the predefined field set to a value other than the predetermined value, e.g., the RESERVED field set to 0, may be transmitted. This GPM is received by all of the hybrid MNs that have not yet switched to another network, such that these other hybrid MNs (MN 3 in this example), can also cease monitoring the paging channel and go back to sleep. By allowing all of the non-hybrid MNs to go back to sleep without awaiting the DBM, the battery power of the non-hybrid MNs is further conserved according to this embodiment, while still permitting one or more hybrid MNs to be notified if another network desires to establish communications.

According to one aspect of the present invention, all or a portion of the system of the present invention, such all or portions of the MN 10, anchor FA 20a and target FA 20b, generally operate under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

Figure 9:
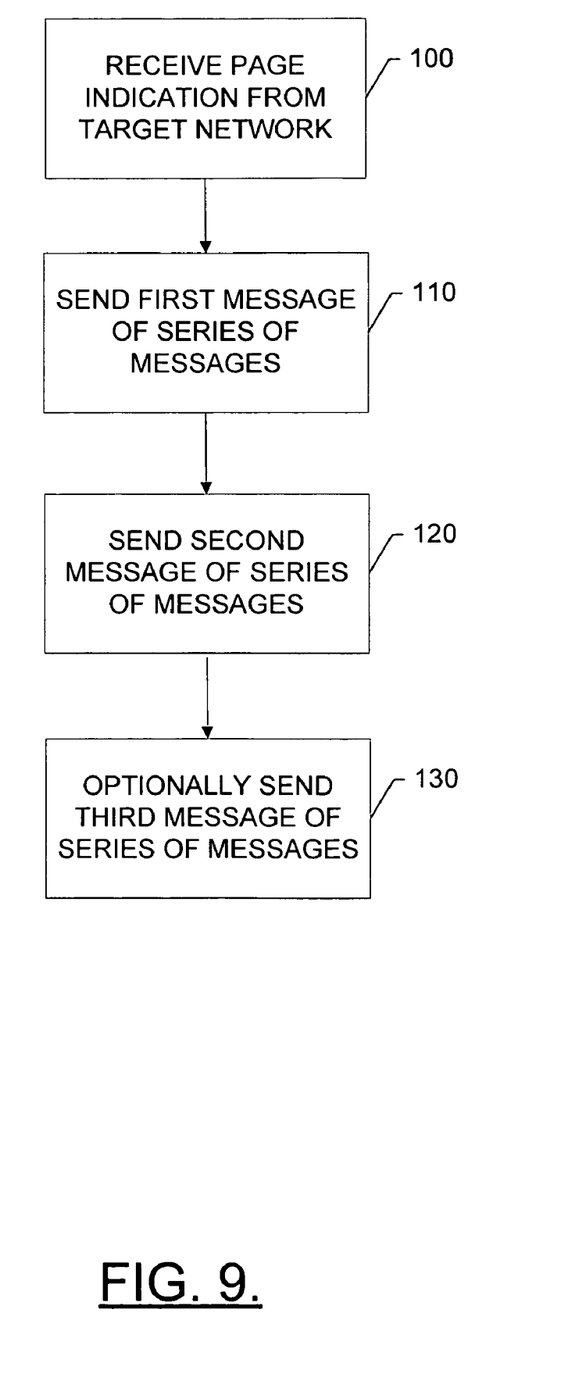
FIG. 9 is a block diagram of an exemplary method for cross-paging a mobile terminal via a data burst message in accordance with an exemplary embodiment of the present invention.

In this regard, FIG. 9 is a block diagram of methods, systems and computer program products according to the invention. It will be understood that each block or step of the control flow diagram, and combinations of blocks in the control flow diagram, can be implemented by computer program instructions. These computer program instructions may be loaded onto a computer or other programmable apparatus to produce a machine, such that the instructions which execute on the computer or other programmable apparatus create means for implementing the functions specified in the control flow diagram block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow diagram block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the control flow diagram block(s) or step(s).

Accordingly, blocks or steps of the block diagram support combinations of means for performing the specified functions, combinations of steps for performing the specified functions and program instruction means for performing the specified functions. It will also be understood that each block or step of the control flow diagram, and combinations of blocks or steps in the control flow diagram, can be implemented by special purpose hardware-based computer systems which perform the specified functions or steps, or combinations of special purpose hardware and computer instructions.

In this regard, in a communication network capable of communicating with at least one hybrid mobile terminal and at least one non-hybrid mobile terminal monitoring a slot, a method for cross-paging a selected one of the at least one hybrid mobile terminals includes receiving a page indication from a target network at operation 100. The page indication indicates that the target network desires to communicate with the selected one of the at least one hybrid mobile terminals. At operation 110, a first message of a series of messages is sent to the at least one hybrid mobile terminal and the at least one non-hybrid mobile terminal. The first message directs the at least one non-hybrid mobile terminal to cease monitoring the slot if a predefined field of the first message is set to a predetermined value. At operation 120, a second message of the series of messages may be sent to the at least one hybrid mobile terminal and the at least one non-hybrid mobile terminal. The second message includes a data burst message indicative of the page indication to the selected one of the at least one hybrid mobile terminals. At operation 130, a third message of the series of messages may be sent. The third message directs any remaining ones of the at least one hybrid mobile terminals to cease monitoring the slot.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A network comprising an agent configured to enable communication with at least one hybrid mobile terminal and at least one non-hybrid mobile terminal in a slot, the agent including a processor and memory including computer program code, the memory and the computer program code configured to, with the processor, cause the agent to perform at least:
   receiving a page indication from a target network, the page indication indicating that the target network desires to communicate with a selected hybrid mobile terminal, and
   issuing a series of messages to the at least one hybrid mobile terminal and the at least one non-hybrid mobile terminal, the series of messages including:
      a first message for directing the at least one non-hybrid mobile terminal to cease monitoring the slot if a predefined field of the first message is set to a predetermined value; and
      a second message including a data burst message indicative of the page indication to the selected hybrid mobile terminal.

2. A network according to claim 1, wherein the series of messages further comprises a third message for directing remaining ones of the hybrid mobile terminals to cease monitoring the slot.

3. A network according to claim 1, wherein the data burst message includes a predefined code indicative of the page indication.

4. A network according to claim 1, wherein the selected hybrid mobile terminal is configured to switch from the network to the target network in response to the data burst message.

5. A network according to claim 1, wherein the processor, memory and the computer program code further cause the agent to perform receiving network and service availability information from the target network.

6. A network according to claim 1, wherein the at least one hybrid mobile terminal ceases to monitor the slot if the predefined field of the first message of the series of messages is set to a value other than the predetermined value.

7. An apparatus comprising a processor and memory including computer program code, the memory and the computer program code configured to, with the processor, cause the apparatus to perform at least:
   receiving a series of messages from an anchor network in communication with the apparatus while the apparatus is monitoring a slot, the apparatus being enabled to communicate with a target network, the series of messages including:
      a first message for directing any non-hybrid mobile terminal in communication with the anchor network to cease monitoring the slot if a predefined field of the first message is set to a predetermined value; and
      a second message including a data burst message indicative of a page indication to the apparatus, the page indication indicating that the target network desires to communicate with the apparatus.

8. An apparatus according to claim 7, wherein the data burst message includes a predefined code indicative of the page indication.

9. An apparatus according to claim 7, wherein the apparatus is configured to switch from the anchor network to the target network in response to the data burst message.

10. An apparatus according to claim 7, wherein the apparatus ceases to monitor the slot if the predefined field of the first message of the series of messages is set to a value other than the predetermined value.

11. A method comprising:
    receiving a page indication from a target network, the page indication indicating that the target network desires to communicate with a selected hybrid mobile terminal in a communication network enabled to communicate with at least one hybrid mobile terminal and at least one non-hybrid mobile terminal monitoring a slot;
    sending a first message of a series of messages to the at least one hybrid mobile terminal and the at least one non-hybrid mobile terminal, the first message directing the at least one non-hybrid mobile terminal to cease monitoring the slot if a predefined field of the first message is set to a predetermined value; and
    sending a second message of the series of messages to the at least one hybrid mobile terminal and the at least one non-hybrid mobile terminal, the second message including a data burst message indicative of the page indication to the selected hybrid mobile terminal.

12. A method according to claim 11, further comprising sending a third message of the series of messages, the third message directing remaining ones of the hybrid mobile terminals to cease monitoring the slot.

13. A method according to claim 11, further comprising receiving network and service availability information from the target network.

14. A method according to claim 11, wherein sending the first message further comprises directing the at least one hybrid mobile terminal to cease to monitor the slot if the predefined field of the first message of the series of messages is set to a value other than the predetermined value.

15. A computer program product comprising at least one computer-readable storage medium having computer-readable program code portions stored therein, the computer-readable program code portions comprising:
    a first executable portion for receiving a page indication from a target network, the page indication indicating that the target network desires to communicate with a selected hybrid mobile terminal in a communication network enabled to communicate with at least one hybrid mobile terminal and at least one non-hybrid mobile terminal monitoring a slot;

a second executable portion for sending a first message of a series of messages to the at least one hybrid mobile terminal and the at least one non-hybrid mobile terminal, the first message directing the at least one non-hybrid mobile terminal to cease monitoring the slot if a predefined field of the first message is set to a predetermined value; and a third executable portion for sending a second message of the series of messages to the at least one hybrid mobile terminal and the at least one non-hybrid mobile terminal, the second message including a data burst message indicative of the page indication to the selected hybrid mobile terminal.

16. A computer program product according to claim 15, further comprising a fourth executable portion for sending a third message of the series of messages, the third message directing remaining ones of the hybrid mobile terminals to cease monitoring the slot.

17. A computer program product according to claim 15, further comprising a fourth executable portion for receiving network and service availability information from the target network.

18. A computer program product according to claim 15, wherein the second executable portion includes further instructions for directing the at least one hybrid mobile terminal to cease to monitor the slot if the predefined field of the first message of the series of messages is set to a value other than the predetermined value.

19. A system comprising:
an anchor network configured to communicate with at least one hybrid mobile terminal and at least one non-hybrid mobile terminal in a slot; and
a target network configured to issue a page indication to the anchor network, the page indication indicating that the target network desires to communicate with a selected hybrid mobile terminal,
wherein the anchor network issues a series of messages to the at least one hybrid mobile terminal and the at least one non-hybrid mobile terminal, the series of messages including:
a first message for directing the at least one non-hybrid mobile terminal to cease monitoring the slot if a predefined field of the first message is set to a predetermined value; and
a second message including a data burst message indicative of the page indication to the selected hybrid mobile terminal.

20. A system according to claim 19, wherein the series of messages further comprises a third message for directing remaining ones of the at least one hybrid mobile terminals to cease monitoring the slot.

21. A system according to claim 19, wherein the at least one hybrid mobile terminal ceases to monitor the slot if the predefined field of the first message of the series of messages is set to a value other than the predetermined value.

22. A network comprising:
means for receiving a page indication from a target network, the page indication indicating that the target network desires to communicate with a selected hybrid mobile terminal, the network being enabled to communicate with at least one hybrid mobile terminal and at least one non-hybrid mobile terminal in a slot; and means for issuing a series of messages to the at least one hybrid mobile terminal and the at least one non-hybrid mobile terminal, the series of messages including:
a first message for directing the at least one non-hybrid mobile terminal to cease monitoring the slot if a predefined field of the first message is set to a predetermined value; and
a second message including a data burst message indicative of the page indication to the selected hybrid mobile terminal.

23. A network according to claim 22, further comprising a means for issuing a third message for directing remaining ones of the hybrid mobile terminals to cease monitoring the slot.

24. A network according to claim 22, wherein the data burst message includes a predefined code indicative of the page indication.

25. A network according to claim 22, wherein the at least one hybrid mobile terminal ceases to monitor the slot if the predefined field of the first message of the series of messages is set to a value other than the predetermined value.

26. A network comprising an agent configured to enable communication with at least one hybrid mobile terminal in a slot, the agent including a processor and memory including computer program code, the memory and the computer program code configured to, with the processor, cause the agent to perform at least:
receiving a page indication from a target network, the page indication indicating that the target network desires to communicate with a selected hybrid mobile terminal, and
issuing a data burst message having a predefined code indicative of the page indication to the selected hybrid mobile terminal, wherein the data burst message is issued in sequence following a general page message, and wherein the selected hybrid mobile terminal ceases to monitor the slot if the predefined field of the general page message is set to a value other than the predetermined value.

27. A network according to claim 26, wherein the data burst message is issued in sequence prior to a general page message.

28. A network according to claim 26, wherein in response to a predefined field of the general page message having a predetermined value, the selected hybrid mobile terminal is directed to monitor the slot for subsequent transmission of the data burst message.

29. An apparatus comprising a processor and memory including computer program code, the memory and the computer program code configured to, with the processor, cause the apparatus to perform at least:
receiving a data burst message from an anchor network, the data burst message having a predefined code indicative of a page indication to the apparatus monitoring a slot while in communication with an anchor network and configured to communicate with a target network,
wherein the page indication is received by the anchor network from the target network, the page indication indicating that the target network desires to communicate with the apparatus,
wherein the data burst message is issued in sequence following a general page message, and
wherein the apparatus ceases to monitor the slot if the predefined field of the general page message is set to a value other than the predetermined value.

30. An apparatus according to claim 29, wherein the data burst message is issued in sequence prior to a general page message.

31. An apparatus according to claim 29, wherein in response to a predefined field of the general page message having a predetermined value, the apparatus is directed to monitor the slot for subsequent transmission of the data burst message.

* * * * *